Oct. 18, 1966  W. T. ANDERSON ETAL  3,280,301
ELECTRICALLY HEATED FLUID TRANSPORTING APPARATUS
Filed June 25, 1964
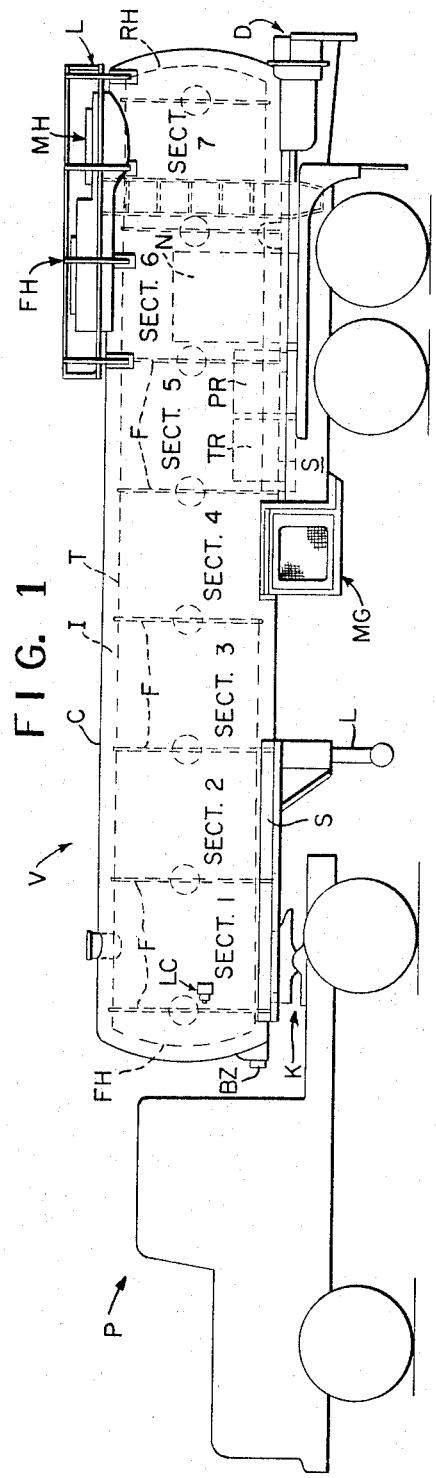
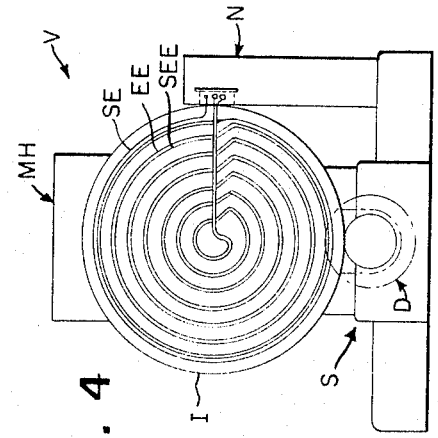
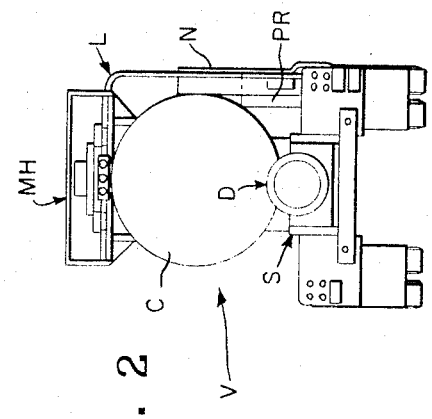
INVENTORS
WILLIAM T. ANDERSON
DONALD E. HALLAM
LAWRENCE H. LYONS
ALFRED C. MUELLER
PAUL B. NELSON
BY  *Harry E. Braddock*
ATTORNEY

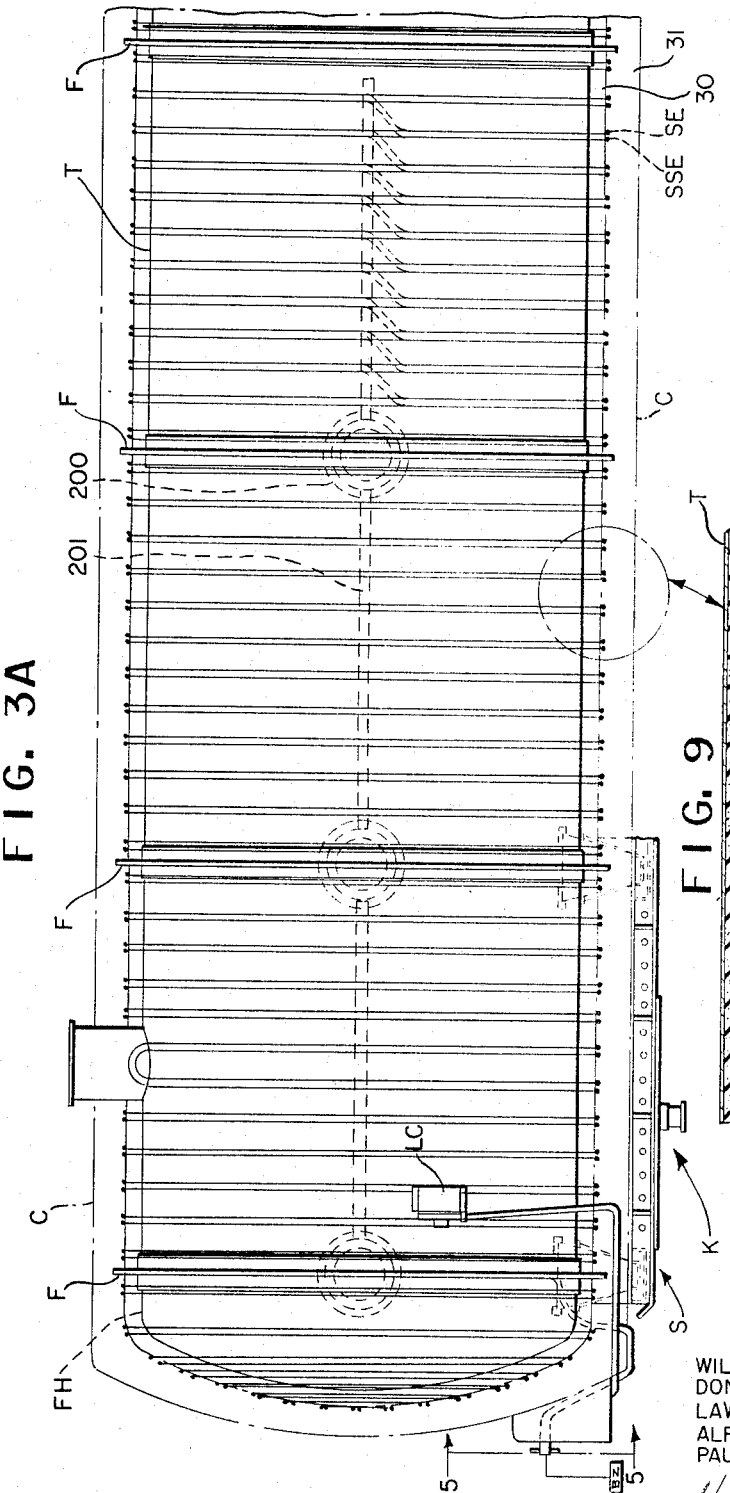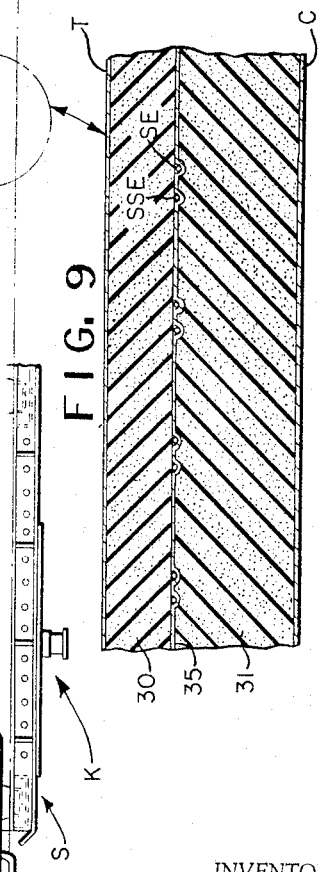

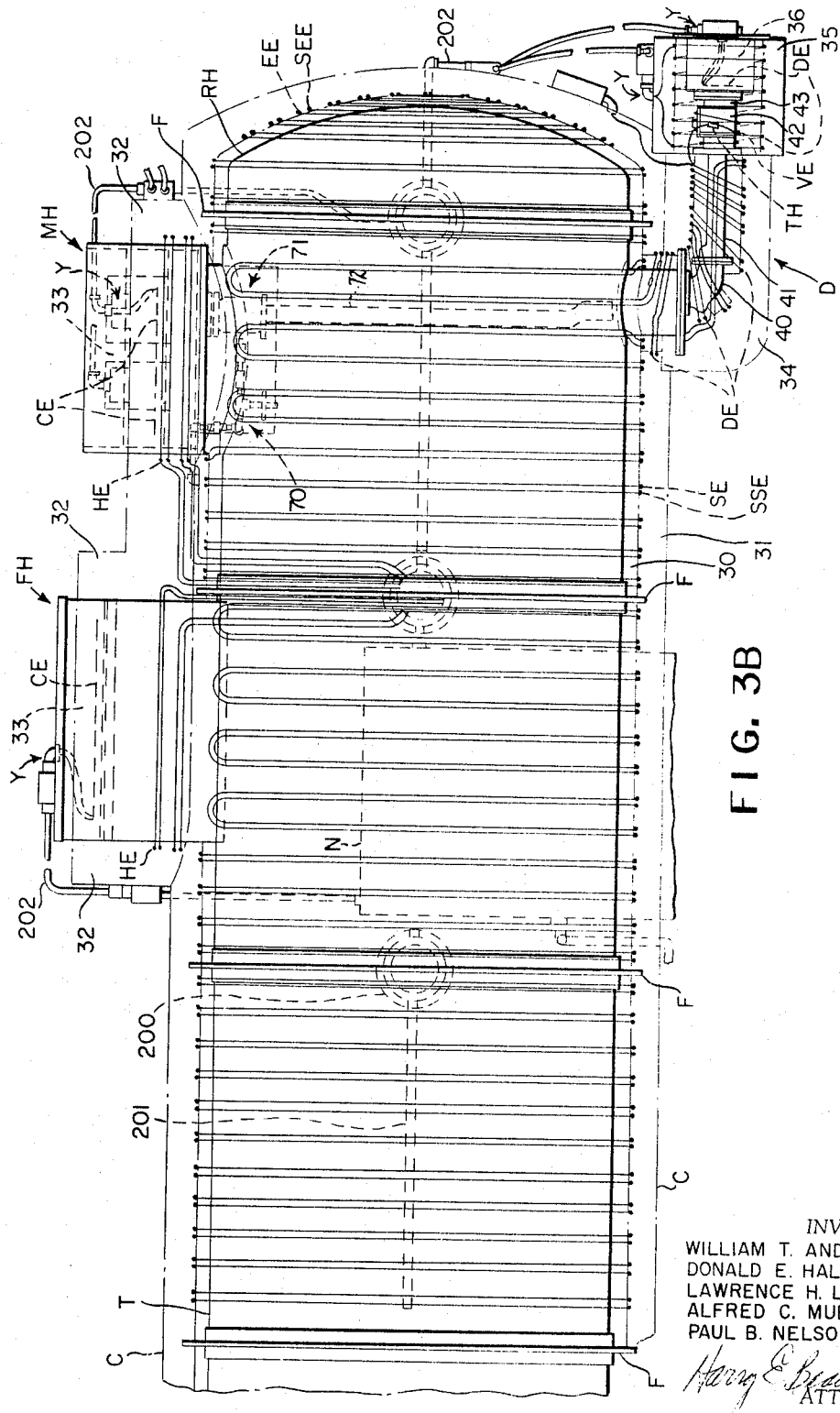

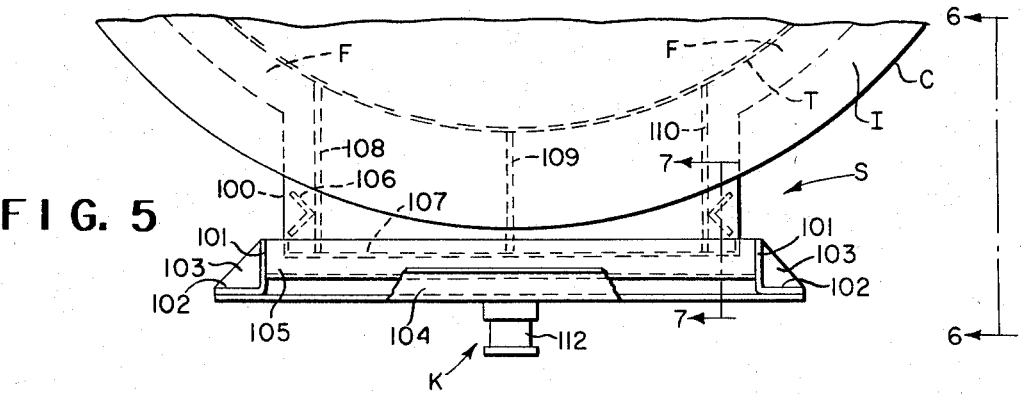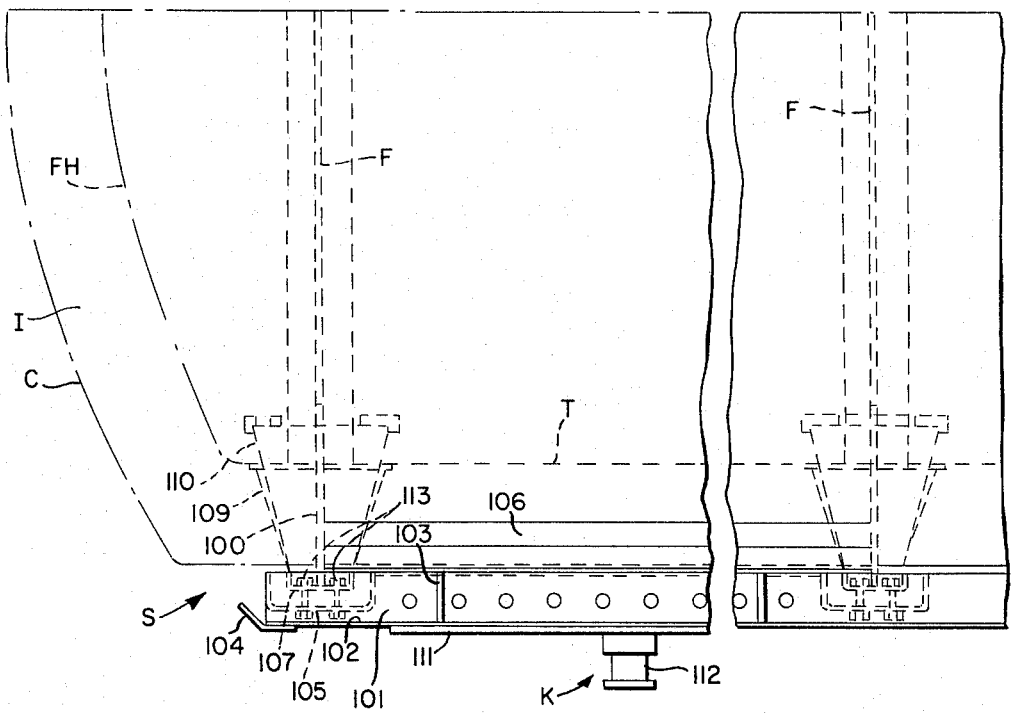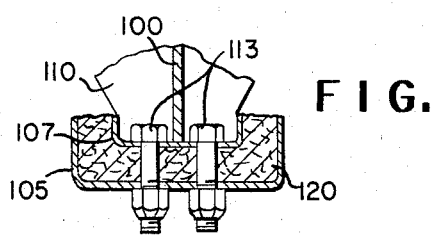

INVENTORS
WILLIAM T. ANDERSON
DONALD E. HALLAM
LAWRENCE H. LYONS
ALFRED C. MUELLER
PAUL B. NELSON
BY
*Harry E. Buddock*
ATTORNEY United States Patent Office 3,280,301
Patented Oct. 18, 1966

3,280,301
ELECTRICALLY HEATED FLUID TRANSPORTING APPARATUS
William T. Anderson, Donald E. Hallam, Lawrence H. Lyons, and Alfred C. Mueller, Wilmington, and Paul B. Nelson, Claymont, Del., assignors to E. I. du Pont de Nemours and Company, Wilmington, Del., a corporation of Delaware
Filed June 25, 1964, Ser. No. 377,969
8 Claims. (Cl. 219—320)

This invention relates to the problem of transporting and storing large quantities of temperature-sensitive fluids while maintaining the fluids precisely within narrow preselected temperature ranges.

More specifically, this invention involves the combination of a tank, vehicle, and temperature control system to give improved temperature control for temperature-sensitive fluids carried by the vehicle.

Such combinations are needed and desirable in a number of fields where precise temperature control is required to prevent deterioration or degradation of the material being stored or transported. Some requirements exist for maintaining a large body of fluid within narrow limits such as $\pm 2°$ C. for considerable periods of time and travel. In addition, it is usually a requirement that such combinations achieve a maximum payload with minimum weight, space, and power. Such combinations for temperature-controlled transport and storage should also be capable of functioning properly for substantial periods of time with minimum attention or maintenance. They should be able to function for limited though significant periods without any power input, as in the case of total power failure.

Accordingly, it is an object to provide an improved vehicle-tank-temperature control system combination which meets the above-discussed requirements in a way and to a degree not achieved by prior conventional practice.

It is another object to provide such an improved combination which is simple in construction, easy and economical to operate and maintain, and yet effective and reliable in operation.

Another object is the provision of an improved tank-vehicle-temperature control system combination which will satisfactorily and effectively transport and store large quantities of materials such as 4,4-methylene-diphenylisocyanate over long periods of time and travel while maintaining the material in a liquid condition at a temperature level in the range between 40° C. and 50° C. within $\pm 2°$ C. of the desired temperature.

Another object is the provision of such an improved combination which will not only maintain a fluid load in the tank structure within precise temperature limits during storage and transportation, but which also will maintain the temperature conditions within the desired limits when no fluid is contained in the tank structure, and during the transfer of fluid into and out of the tank structure.

Other objects and advantages will appear from a consideration of the following specification and claims taken in conjunction with the accompanying drawings, in which:

FIGURE 1 is a general side elevational view of a truck and tank-trailer combination embodying principles of the present invention.

FIGURE 2 is a rear end view of the combination shown in FIGURE 1.

FIGURES 3A and 3B are partial side elevational views of the tank trailer shown in FIGURE 1 with parts broken away and hidden parts shown in dotted lines to show the details of the tank structure, and details of the heating means and insulation means of the temperature control arrangement for the tank structure.

FIGURE 4 is a rear end view of the structure shown in FIGURE 3.

FIGURE 5 is a partial sectional view taken transversely of the tank structure at line 5—5 of FIGURE 3 showing details of the mounting or support means for supporting the tank structure on the trailer or vehicle means.

FIGURE 6 is a partial sectional view taken longitudinally of the tank structure at line 6—6 of FIGURE 5 to show details of the mounting or support means for supporting the tank structure on the trailer or vehicle means.

FIGURE 7 is an enlarged cross-sectional view taken at line 7—7 of FIGURE 5 to show additional details of the support means for the tank structure.

FIGURE 9 is an enlarged partial sectional view taken longitudinally of the tank structure to show in a detailed manner the cooperation of the insulation and heating means with the tank structure.

Figure 8:
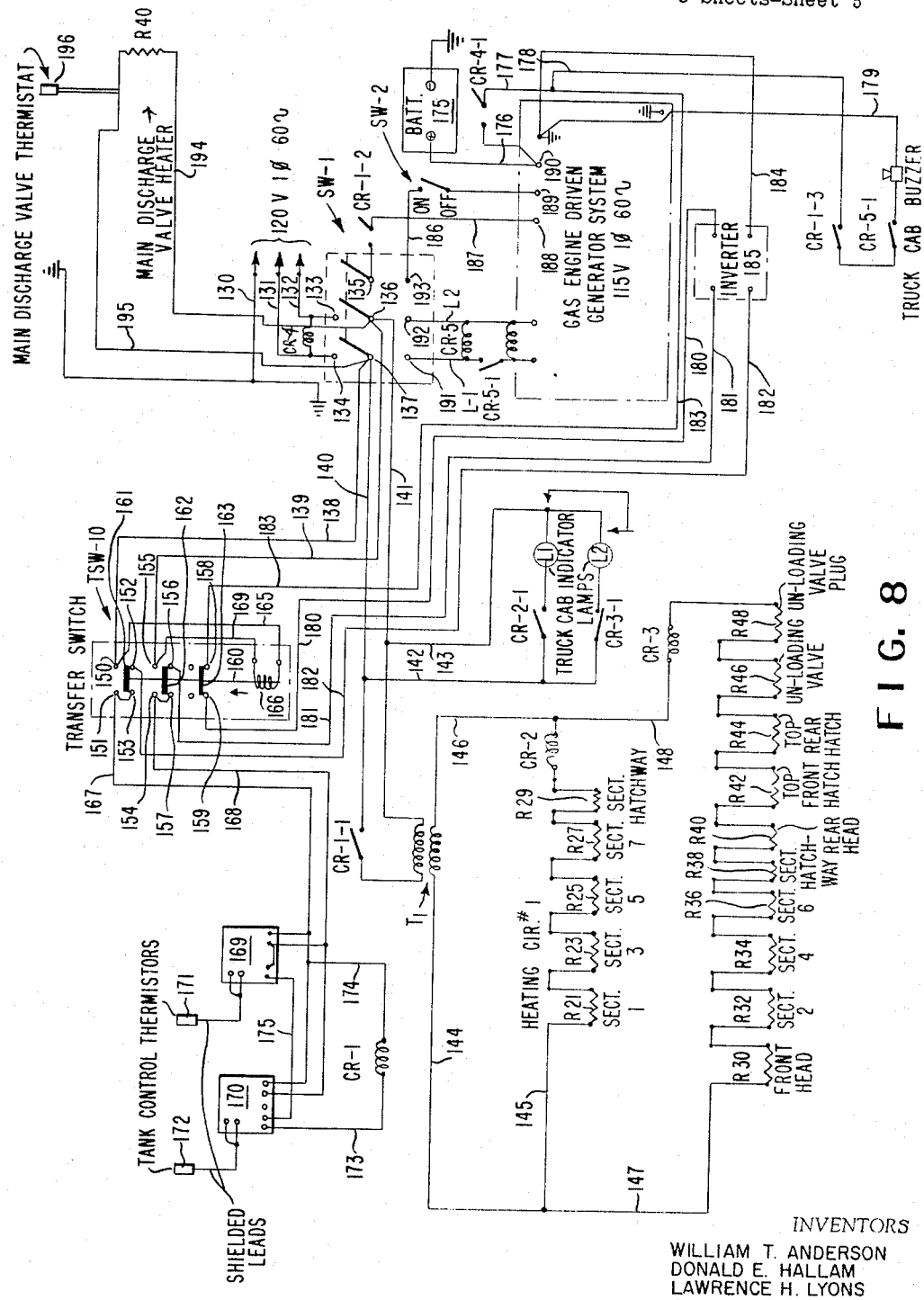
FIGURE 8 is a schematic diagrammatic view of an electrical circuit arrangement of a temperature control means embodying principles of this invention.

The objects of the invention are achieved generally by providing a suitable fluid-tight tank structure with a temperature control arrangement which comprises an electrical heating means cooperating with the tank structure, and necessary control system for the heating means, and further providing heat insulating means cooperating with the tank structure and the heating means. The heating means and the insulating means are designed, constructed, and arranged, relative to each other and relative to the expected environment in which the apparatus is to be used, so that transfer of heat from the environment into the tank structure is substantially prevented, and transfer of heat from within the tank structure to the environment is minimized with such heat losses as do occur being substantially exactly compensated for by the heating means input to the tank structure. The heating means and insulation means further cooperate to accomplish even distribution of the heat produced by the heating means throughout the insulation and around the tank structure so that neither "hot spots" or "cold spots" occur over the tank structure. In addition, a special structural arrangement is provided so that the tank structure is positively mounted and supported on a suitable base or vehicle structure while transfer of heat into and out of the tank structure is effectively minimized.

A preferred embodiment of this invention is generally shown in FIGURES 1 and 2 of the drawings. The tank, vehicle, and temperature control system combination embodying the principles of the invention appears in the form of a wheeled trailer V adapted to be pulled by a truck or tractor P. The trailer, or vehicle component of the combination comprises a set of rear wheels attached in a conventional manner to rear support assembly S, a king pin assembly K and a landing gear assembly L conventionally attached to a forward support assembly S. The support assemblies S support a cylindrical tank structure T in a generally horizontal attitude as shown. The tank T is a fluid-tight structure having a cylindrical portion, a front head portion FH and a rear head portion RH and conventionally formed from suitable material such as for example, nickel or stainless steel. The cylindrical portion of tank T is provided with longitudinally spaced annular stiffener elements F which divide the exterior of the tank into a longitudinal series of sections. The tank is generally surrounded by a body of heat insulating material I, such as for example, foamed or cellular polystyrene, and an outer casing or housing C preferably formed of suitable material such as aluminum. The tank structure T is provided with a manhole unit MH, a front hatch unit FH, and a main discharge fitting unit D. In addition, the tank structure T is provided with an electrical heating means (not shown in FIGURES 1 and 2) for providing the necessary heat input to maintain the desired temperature control. The trailer or vehicle means T is provided with the usual platform and ladder assembly L and with a motor-generator unit MG for providing electrical energy to the electrical heating means. Also mounted on the trailer T is a control box N for the heating means, a temperature recorder unit TR and a pressure recorder unit PR for recording conditions in the tank. Elements BZ and LC are elements for indicating the condition of the temperature control system as will be described in a later point in the specification.

A more detailed showing of the electrical heating means, the insulation means, the tank structure and the relationships between these basic components appears in FIGURES 3, 4, and 9.

In FIGURE 3 the details of the tank structure are shown, including the main inlet fitting 71 and the venting fitting 70 which are mounted in the recessed structure of the manhole unit MH. Also shown in FIGURE 3 is main discharge fitting D at the bottom rear portion of tank T. Main discharge fitting D comprises a fluid conduit structure formed of connected elements 40, 41, and 43 leading downwardly and rearwardly from the bottom of tank T. A suitable valve 42 is provided in this conduit structure. The front hatch unit FH houses and provides access to other desirable fittings not shown, such as pressure relief fittings for safety.

As indicated in the drawings, the tank structure is surrounded by a first uniform layer of suitable heat insulating material 30, which may be foamed polystyrene, and which is preferably bonded to the exterior of the tank structure.

A double electrical heating conduit or cable is positioned in an evenly distributed pattern around and supported on the first layer 30 of insulating material. One of the conduits, indicated by reference letters SE on the cylindrical portion of the tank and EE on the other portions of the tank, is the active heating conduit and the other, which is a duplicate of the one and indicated by the reference letters SSE and SEE, is a spare which may be utilized selectively in the event of failure of or damage to the first one of the conduits. A heating conduit for a given section of the tank is connected in conventional fashion through a junction box unit 200 and conduit elements 201 to the control box N. Power is applied to the control box N selectively from the motor-generator unit MG mounted beneath the tank structure during travel of the trailer or from a cable plugged into a power source at loading, unloading, or storage points.

FIGURE 4 illustrates the arrangement of the heating conduits or cables on the rear head portion of the tank.

It will be seen in FIGURE 3 that the front hatch unit FH, the manhole unit MH, and the main discharge fitting D, are provided with insulation 32, 33 and with heating conduits HE, CE. This insures that venting, filling, discharge, and pressure overload discharge features will be subject to the desired temperature control. This is important under certain circumstances in which the fluid may solidify if the temperature limits are crossed.

A second outer layer of suitable heat insulating material 31 generally engages and uniformly surrounds the first layer 30 and the heating conduit. A metallic housing or casing C preferably formed of aluminum engages and surrounds the outer layer of heat insulating material 31. Preferably housing C is not bonded to layer 31. If desired, an additional layer of thin metal such as a foil may be positioned between the outer layer 31 and the inner layer 30 surrounding and in engagement with the heating conduit in order to give optimum distribution of the heat produced by the conduit. Layers 30, 31 are of uniform thickness.

Connections Y to the heating conduit are flexible to permit limited movement and prevent damage to the conduit due to slight relative movements of the tank structure, insulation, and tank structure or between different portions of each.

The tank structure T is mounted on support members S of the vehicle or trailer structure by special support elements so that heat transfer into and out of the tank structure at the support points is minimized. The special support elements are shown in detail in FIGURES 5, 6, and 7 as used at the front end of the tank structure T. The support elements at the rear of the tank structure are the same. As shown in FIGURES 5, 6, and 7, the first stiffener rings F at the front end of the tank structure are provided with an enlarged radially downwardly extending plate portion 100. A plurality of vertically extending trapezoidal-shaped plates 108, 109, and 110 are secured as by welding to plate portion 100 and the underside of the tank structure as shown. A first horizontal tray-like element 107 is secured in a suitable manner such as welding across the lower portions of elements 108, 109, 110 and plate portion 100.

A second horizontal tray-like element 105 corresponding to the first tray-like element 107 is disposed beneath element 107 and spaced therefrom. Element 105 is suitably secured at each end to the parallel horizontal longitudinally extending angle iron elements 101–102 which are directly connected to the king pin assembly and wheels to form the main portion of the vehicle structure. A body of suitable rigid heat insulating material 120 is positioned between the tray-like elements 107 and 105 to provide vertical support to the tank structure T through elements 107. Preferably material is formed of a solid dense organic polymer such as a suitable polyester reinforced with glass fibers. The body of material is strong enough to provide positive support of the tank structure while providing the desired heat insulation action. A number of vertically extending bolts 113 interconnect tray-like elements 107 and 105 to limit vertical movement of the tank relative to the lower tray-like element 105 and the basic vehicle or trailer structure. The mating cross sectional contours of the spaced tray-like elements in cooperation with the configuration of the mass of insulating material 120 as shown in FIGURE 7 also cooperate to prevent longitudinal movement of the tank relative to the basic vehicle or trailer structure.

The details of the heating means and the control means therefor together with the preferred arrangement of the electrical heating conduit will be more clearly understood by reference to FIGURE 8 in conjunction with the following description.

Transformer T1 applies heating power to the two parallel branch circuits identified as "heating circuit 1" and "heating circuit 2." When heating circuit 1 is energized and functioning, relay coil CR-2 will also be energized to close switch CR-2-1 to cause indicator lamp L1 to be lighted and indicate the condition of this circuit. Relay coil CR-3, switch CR-3-1, and lamp L2 function in a like manner for heating circuit 2.

Heating conduit portions R21, R23, R25, R27, and R29 are connected in series across conductors 144 and 146 to form heating circuit 1. As indicated these heating conduit or cable portions respectively are positioned for heating alternate tank sections 1, 3, 5, 7, and the front hatch structure.

Heating conduit portions R30, R32, R34, R36, R38, R40, R42, R44, R46, and R48 are connected in series across conductors 147 and 148 to form heating circuit 2. As shown, these heating conduit portions respectively are positioned for heating alternate tank sections as follows, a front head section, sections 2, 4, 6, the manhole structure, the rear head section, the front hatch closure element, the manhole closure element, the unloading or main discharge fitting conduit, and the closure or plug controlling access to the main discharge fitting. It will be clear that in the event of failure of one of the heating circuits, the other heating circuit will be able to provide heat input to alternate portions of the tank structure and maintain a somewhat evenly distributed heating pattern for at least a short period.

The primary winding of transformer T1 is connected by conductors 140 and 141 to contacts 137 and 136 in control switch SW–1. Switch SW–1 is of the three pole double throw type. A relay-operated switch CR–1–1 is connected in conductor 140. As shown, contacts 135, 136, and 137 are each connected to one of the movable elements of switch SW–1. Contact 135 is connected through relay-operated switch CR–1–2, conductor 187, and contact 188 to the starting device for the motor-generator unit or gas engine driven generator system as shown. Switch SW–1 is provided with two sets of contacts, one set comprising contacts 133, 134 and the other set comprising contact elements 191, 192, and 193. When the movable switch elements are moved to the upper operative position, as shown in FIGURE 8, engaging contacts 133 and 134, single phase, 60 cycle 120 volt power is supplied to contacts 136, 137 through conductors 131, 132 from a cable plugged into a conventional stationary power supply separate from the tank trailer as for example at an unloading, loading, or storage point. When the movable elements of switch SW–1 are in the lower operative position, as viewed in FIGURE 8, engaging contacts 191, 192, 193, single phase, 60 cycle 115 volt power can be supplied to contacts 136, 137 through leads L1 and L2 from the output of the gas engine driven generator system. Power is supplied to the heating circuits 1 and 2 by conductors 140 and 141 which are connected to contacts 136, 137 of switch SW–1.

Temperature sensitive thermistor elements 171 and 172 are positioned at suitable locations on the tank structure. Element 171 is for normal tank temperature control, set at the desired operating temperature limit for the tank, and is connected through a conventional temperature controller unit 169 to actuate heating circuits 1 and 2 in a conventional manner by the action of current passing through relay coil CR–1 which closes switch CR–1–1 to supply power to transformer T1. Element 172 is for over temperature cut-off control, set at the upper temperature limit for the tank, and is connected through another conventional temperature controller unit 170 to terminate operation of heating circuits 1 and 2 by cutting off current passing through relay coil CR–1 which causes switch CR–1–1 to open and deenergize transformer T1 and the heating circuits 1 and 2. In the embodiment shown, the thermistor elements 171, 172 preferred are commercial products of the Minneapolis-Honeywell Regulator Co. and identified by Model No. L7041A each enclosed and potted in a metal tube. The two temperature control units 169, 170 are commercial products of the Minneapolis-Honeywell Regulator Co. identified by Model No. R7079A for use on 115 volt 60 cycle service and operatively connected in conventional manner with elements 171, 172 and relay coil CR–1 as shown in FIGURE 8.

Relay coils CR–5 and relay operated switch CR–5–1 cooperate to provide a time delay between starting of the motor-generator and application of power through leads L1 and L2 to contact elements 191, 192 of switch SW–1.

When control switch SW–1 is positioned to supply outside 120 volt A.C. power to the system from conductors 131, 132 to switch contacts 136, 137, this 120 volt power is supplied first through conductors 138, 139, contacts 150, 155 of the transfer switch TSW–10, and conductors 164, 165 to actuating coil 166 of transfer switch TSW–10. Application of power across conductors 131, 132 energizes relay coil CR–4 which opens normally closed switch CR–4–1 in conductor 177.

Transfer switch TSW–10 comprises three sets of contacts and three movable contact elements 161, 162, and 163 cooperating therewith as shown. Movable contact elements 161, 162, 163 are mounted on movable switch member 160 which is normally positioned by spring force or gravity in the lower position as viewed in FIGURE 8. Energization of coil 166 will cause member 160 and the movable contact elements 161, 162, 163 to move to the upper operative position as viewed in FIGURE 8 and connect conductors 138 and 139 to supply energizing power to the temperature controller units 169, 170 through contacts 150, 151, 154, 155, of the transfer switch and conductors 167, 168. With the system in this condition, a drop in the tank temperature below the level set for temperature sensing element 171 will cause the controller unit 169, in combination with the other controller unit 170, to send current through relay coil CR–1. Relay coil CR–1 then causes switch CR–1–1 to close which applies power to the primary winding of transformer T1 to actuate heating circuits 1 and 2. Heating circuits 1 and 2 will remain operative until they transfer enough heat to the tank structure to raise the tank temperature to the level set for temperature sensing element 171. When this occurs, temperature sensing element 171 and its temperature controller unit 169 will terminate current through relay coil CR–1 to the point where switch CR–1–1 will open. This cuts off power to the transformer T1 and the heating circuits 1 and 2 until the temperature again crosses the lower control level of controller 169. Relay coil CR–1, when energized by current from the controller units 169, 170, also actuates switch CR–1–3 to actuate a buzzer or other indicator at a suitable location.

It will be seen that a separate heating circuit is formed by conductors 194, 195, thermostat 196, and heating conduit portion R40 all connected across contact elements 136, 137 of control switch SW–1. This separate circuit provides independent heat for the main discharge valve itself under the independent control of thermostat 196 to maintain a preselected temperature level which may or may not be the same as the level selected for the remainder of the tank structure.

On the other hand, when switch SW–2 is closed and control switch SW–1 is positioned for supply of 115 volt A.C. power to the system from conductors L1 and L2 of the motor-generator system on the trailer, to switch contacts 136, 137, power to operate the temperature controller units 169, 170 is supplied from 12 volt battery 175 through conductor 176, contact 190 of the motor-generator system, through normally closed relay operated switch CR–4–1, conductors 177, 183, contacts 158, 163, 159 of the transfer switch TSW–10, conductor 180, inverter 185, conductors 181, 182, contacts 152, 161, 153, 151, contacts 156, 162, 157, 154 of transfer switch TSW–10 in position as shown in FIGURE 8, and conductors 167, 168. With the system in this condition, representative of vehicle travel or storage without outside power supply, a drop in tank temperature below the level set for temperature sensing element 171 will cause the controller unit 169, in combination with the other controller unit 170 to send current through relay coil CR–1. Relay coil CR–1 causes (a) switch CR–1–1 to close so that power may be applied to transformer T1 and heating circuits 1 and 2 when the motor generator system is started, (b) switch CR–1–2 to close thereby completing the circuit from contact 189, switch SW–2, conductor 186, contact 193 of switch SW–1, conductor 187, and contact 188 to actuate or start the motor generator system, (c) switch CR–1–3 to close to actuate a buzzer or other device and indicate the condition of the system. After closing of switch CR–1–2 has caused the gas driven generator system to start, 115 volt A.C. power is applied through leads L1 and L2, contacts 191, 192, 136, 137 of switch SW–1 and conductors 140, 141 to energize transformer T1 and heating circuits 1 and 2. At the same time power is supplied to transfer switch TSW–10 through conductors 138, 139, and to main discharge valve heater R40 through conductors 194, 195, and thermostat 196 for its independent operation. Application of power to transfer switch TSW-10 through conductors 138, 139 energizes coil 166 and switches energization of the temperature controller units from the battery-inverter supply to supply from the motor generator output. In addition, power for charging battery 175 is applied from the motor-generator output from contact 190 through conductor 176.

As before, heating circuits will remain operative until enough heat is transferred to the tank structure to raise the tank temperature to the level set for temperature sensory element 171. When this occurs, temperature sensing element 171 and its controller unit 169, in combination with the other controller unit 170 will reduce or terminate current through relay coil CR-1 to the point where switches CR-1-1, CR-1-2, and CR-1-3 will open. This respectively cuts off power to the transformer T1 and heating circuits 1 and 2, cuts off the motor-generator system operation, cuts off operation of the indicator lamps, and de-energizes coil 166 of transfer switch so that the transfer switch assumes its position in which power for operation of the temperature controller units is again supplied from the battery and inverter as described before. The system will remain in this condition until the temperature again crosses the lower control level.

It is believed that the foregoing description presents a clear picture of the features of the present invention and their operation.

Before filling the tank structure with a temperature sensitive fluid at the desired temperature, it of course is necessary to operate the heating system of the tank structure in order to bring the tank temperature to the desired temperature. The normal conditions of intended use for the apparatus of this invention involves the desired temperature being somewhat elevated with respect to the ambient temperature of the apparatus environment.

The closure units for the front hatch and manhole assemblies which comprise insulation means 33 and heating conduit portions CE are removable so that necessary connections can be made to the tank for loading and unloading. In addition, the closure unit for the access opening to the main discharge valve 42, with its insulation 36 and heating conduit portion DE is likewise removable for making necessary connections to valve 42 and conduit element 43.

The heating conduit portions are resistance heated conductor assemblies, each preferably comprising a single conductor stranded copper wire insulated with a suitable material such as TFE-fluorocarbon resin.

The apparatus as described in the foregoing achieves the objects of the invention. The described apparatus can maintain a large mass of fluid within a temperature range of ±2° C. between a lower limit of about 30° C. and an upper limit of about 100° C., with very effective use of space, weight and power. High reliability, reduced maintenance, and reduced operating attention have been achieved. The advantages and beneficial results resulting from use of apparatus of this invention are very significant, especially relative to heating systems using circulating hot air or liquids.

Although a single preferred embodiment of the invention has been described in accordance with the patent statute, many modifications and changes within the spirit of this invention will occur to those skilled in the art and such are considered to fall within the scope of the following claims:

We claim:

1. An improved temperature-controlled apparatus for storage and transportation of temperature-sensitive fluids at specified temperature levels generally above the ambient temperature of the apparatus environment, said apparatus comprising a vehicle means, said vehicle means comprising a supporting structure, said apparatus further comprising a fluid-tight tank structure positioned on said supporting structure, and a temperature control system operatively associated with said tank structure and said supporting structure for maintaining the tank structure and contents of the tank structure accurately within a narrow temperature range during storage and during transfer of fluid into and out of the tank structure, said tank structure comprising a fluid-tight wall member defining a fluid storage zone, said tank structure further comprising inlet and outlet means for controlling transfer of fluid between the storage zone and points outside the zone, said tank structure further comprising at least one first support element; said temperature control system comprising an electrical heating means positioned in operative controlled heat transfer relationship to said wall member, and said inlet and outlet means of said tank structure, a source of electrical energy constructed and arranged to be operatively connected to said heating means, a control means operatively associated with said heating means for controlling the same, said control means further comprising temperature sensing means cooperating with said control means and said tank structure so that said temperature control system maintains the tank structure and contents at a predetermined temperature level; said temperature control system further comprising heat insulation means cooperating with said tank structure for minimizing heat transfer into and out of said tank structure, said heat insulation means further comprising at least one second support element formed of heat insulating material co-operating with each of said first support elements of said tank structure and positioned between said first support elements and said supporting structure of said vehicle means to minimize transfer of heat into said tank structure from said supporting structure and out of said tank structure to said supporting structure while supporting the tank structure on said vehicle supporting structure; said electrical heating means comprising an electrical heating conduit positioned and arranged in a substantially uniformly distributed pattern about said tank structure, said inlet and outlet means of the tank structure comprising a primary discharge fitting unit provided with a discharge valve and discharge conduit, said electrical heating conduit comprising one branch portion positioned and arranged to supply heat to said primary discharge fitting unit, and another branch portion, said one branch portion comprising a heater unit and a thermostat unit operatively connected thereto to control the same and maintain said primary discharge fitting unit at a predetermined temperature level, switching means for selectively connecting said electrical heating means to said source of electrical energy, said one branch portion of said electrical heating conduit being directly connected to said switching means for independent operation of said heater unit and maintenance of said primary discharge fitting unit at its predetermined temperature level independently of and concurrently with maintenance of the remainder of said tank structure at its predetermined temperature level.

2. The improved apparatus of claim 1 in which said heat insulation means comprises a substantially uniform and substantially continuous layer of insulating material cooperating and in surrounding engagement with said wall member and said inlet and outlet means of said tank structure, said electrical heating conduit being positioned and supported within and throughout said layer.

3. The improved apparatus of claim 2 in which said another branch portion of said electrical heating conduit comprises a plurality of branch circuits constructed and arranged to heat alternate portions of said tank structure.

4. The improved apparatus of claim 3 in which a second complete separate duplicate electrical heating conduit corresponding to said electrical heating conduit is provided and positioned in said layer of insulating material for use as a spare.

5. The improved apparatus of claim 3 in which portions of said electrical heating conduit extending between portions of said tank structure and said vehicle means supporting structure are flexibly movably mounted to accommodate relative movement between said structures and portions of said structures without damage to said conduit.

6. The improved apparatus of claim 3 in which said heat insulation means comprises a first layer of heat insulating material in engagement with the tank structure exterior, a second layer of metallic foil in engagement with and surrounding said first layer, a third layer of heat insulating material in engagement with and surrounding said layer of foil, said three layers being encased in an outer metallic housing.

7. The improved apparatus of claim 6 in which said electrical heating conduit is positioned between said first and second layers so that said second layer of metallic foil evenly distributes heat produced by said conduit uniformly throughout the insulating material and over the tank structure exterior.

8. The improved apparatus of claim 7 which further comprises a means mounted on said vehicle means for continuously recording pressure and temperature conditions within said tank structure.

References Cited by the Examiner

UNITED STATES PATENTS

| | | | |
|---|---|---|---|
| 1,562,991 | 11/1925 | Rudigier | 105—451 |
| 1,706,052 | 3/1929 | Auchincloss | 105—358 |
| 2,606,039 | 8/1952 | La Rue | 280—5 |
| 3,004,130 | 10/1961 | Miller | 219—320 |

RICHARD M. WOOD, *Primary Examiner.*

C. L. ALBRITTON, *Assistant Examiner.*